United States Patent Office 3,224,880
Patented Dec. 21, 1965

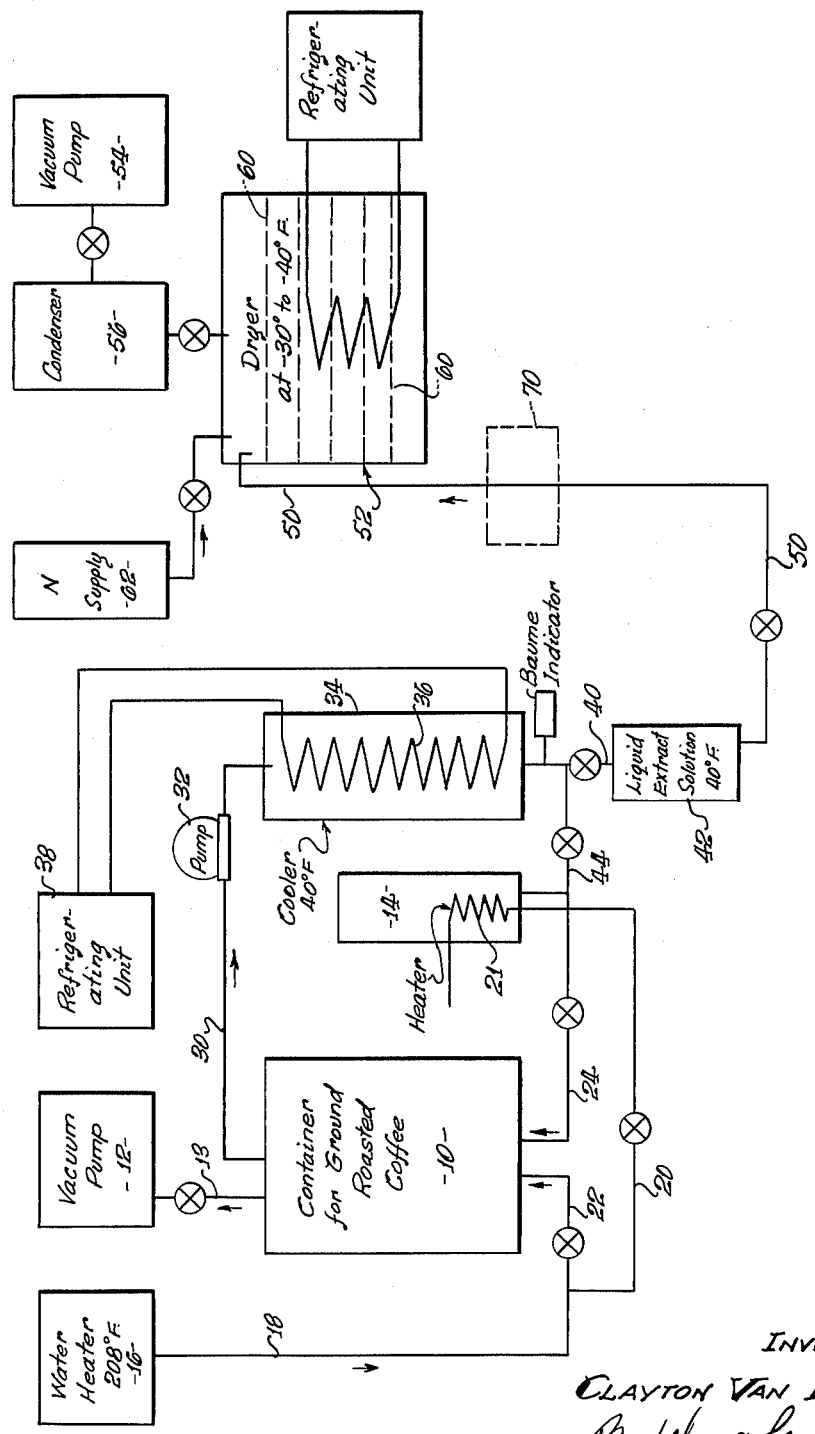

3,224,880
PROCESS OF PRODUCING AN EXTRACT OF
COFFEE, TEA OR THE LIKE
Clayton Van Ike, 10817 Cantara St., Sun Valley, Calif.
Filed Apr. 29, 1963, Ser. No. 276,446
2 Claims. (Cl. 99—71)

The present invention relates to improvements in the preparation of extracts, such as extracts of coffee and tea, to produce a superior quality of soluble extract. The extract of the invention is quickly and wholly soluble in water, either hot or cold. But, as will be developed below, the process of extract preparation has several characteristics, novel as far as is known, which lead to the production of a markedly superior extract.

Among those characteristics, to name only a few, are the re-cycling of an initial portion of an original solution to save for the final product certain coffee or tea constituents that tend to transform under prolonged dissolving action; final drying of the solution at low temperature under vacuum; and exclusion of oxygen and its resultant oxidation of certain constituents throughout the process.

As is well known, properly roasted and ground fresh coffee bean contains a very large variety of organic compounds including some, such as sulphur compounds in the form of mercaptans and acetyls that are quite easily and commonly destroyed in the present preparation of coffee extracts. The preservation of all the coffee bean constituents is necessary to preserve, in an extract, the full flavor and aroma of the coffee in a final beverage. For example, the volatile esters and acids present in the original coffee bean, are found to be largely lacking in conventional present instant coffee extracts. It is a general object of the present invention to preserve in the final extract a large proportion, if not nearly all, of the original constituents that provide the true flavor and aroma.

Also well known is the fact that normal teas contain tannins and caffeins, and very volatile oils which supply the very delicate aromas and flavor to a final tea beverage. As far as is known, present methods of producing a soluble tea extract eliminate those volatile oils. The method of the present invention preserves those oils and produces, as with coffee, a final soluble tea extract in which all the tea aromas and flavors are preserved in the final beverage.

The following specific description refers specifically to coffee, but the process and description are to be taken as equally applicable to tea.

Further characteristics and features of the invention to the end of its objective will appear from the following detailed description of presently preferred operational conditions, with reference to the accompanying drawing in which the figure is a schematic illustrating typical apparatus.

Operation of the system shown schematically in the drawings is typically as follows.

A batch of ground roasted coffee bean (or a batch of normal dried tea leaves) is placed in container 10 which is preferably made of stainless steel to avoid acid or corrosion contamination. For the same reasons the physical system as a whole may be of such material. Container 10 is then closed and a vacuum pulled on it by a suitable vacuum pump 12 to remove oxygen from the container and from the interstitial cavities in the ground bean. The vacuum applied here is preferably as low as is economically feasible with available vacuum pump apparatus, in order to remove as much as oxygen as may be. Thus, a vacuum down to one-tenth atmosphere will reduce oxidation by nine-tenths; one down to one-hundredth atmosphere will reduce oxidation by the atmospheric content of tank 10, by ninety-nine percent.

A batch of liquid solution extract from a previous run (of which, see later) is then introduced into 10 from container 14, via valve controlled line 24, after having been heated to about 180° F. by hot water from water heater 16 via valve controlled lines 18 and 20.

Hot water, typically at about 208° F. or preferably at least under the normal boiling point, is then circulated through the batch in 10 via valve controlled line 22. The resultant solution flows from container 10 via line 30 which may, see later, include a pump 32 to set up circulation. After initial vacuumizing of container 10 by vacuum pump 12 the connecting line 13 may be closed by its valve. Then, on admission of the recirculated solution from 14 and introduction of hot water from 16, the water vapor pressure in 10 will rise to that corresponding to the water temperature or, at the preferred temperature, substantially to normal atmospheric pressure.

The temperature of the solution water introduced to container 10 may be either lower or higher than the preferred temperature of about 208° F., depending on the desired speed of solution formation and the type of coffee being processed. The stated preferred temperature is suitable for reasonable operational speed and average coffee types. With any given coffee, the water temperature may be considerably lower than 208° F. but with proportionately slower solution formation. And, although the usual preferred temperature is under normal boiling point, at least for certain types of coffees, the temperature may be as high as approximately 240° F.

The solution from 10 is then circulated through line 30 into the cooler tank 34, where the solution is cooled down, typically to about 40° F., by suitable cooling arrangements such as cooling coils 36 fed from refrigerating unit 38. Preferably this cooling is done in two steps, first by a plate type heat exchanger using water as the coolant to bring the solution temperature down to around 65° F., and then, by refrigeration, to bring the pre-cooled solution down to about 36° to 40° F.

The heavier, more viscous, first and major part of the solution, beginning preferably at about Baumé 35–45°, is fed from cooler 34 via valve controlled line 40 to or through a tank 42. That tank may either be open or have an upper atmospheric vent. Depending on whether the subsequent drying operations and withdrawal from tank 42 are coterminous with the introduction of solution to 42 that tank may be relatively small or large enough to hold the whole solution volume extracted from a batch in 10. The purpose of cooler 34 is to reduce the temperatures of the volatiles, such as esters and acids or oils that are swept off by the $CO_2$ release from the coffee in the beginning of the process in 10 and bring them back to normalcy, non-volatizing temperatures, in order to prevent their escape. The water is introduced into the container 10 preferably at approximately 208° or more which will also cause the release of the sealed carbon dioxide from the coffee bean at approximately 206°. So, in order to preserve all of the esters and acids or oils of flavor in the closed system, the cooling in 34 reduces the extract solution to a temperature of about 40° before emptying it into container 42.

The system including container 10 and cooler 34 with the interconnecting piping is closed, so that the solution does not come into contact with atmospheric oxygen while hot. The tank 14 and its piping connections to 34 and 10 also are preferably a part of the closed system. The solution does not contact atmospheric oxygen before its discharge at low temperature into 42 after being cooled in 34 to about 35°–40° F. From tank 42 on, the solution is kept at relatively low temperature.

As circulation through the batch in 10 and through cooler 34 proceeds, the solution becomes thinner. When the solution Baumé drops down to, say 10°, the valve on 40 and that on diversion line 44 are manipulated to direct the remaining small part of the solution into the tank 14, where that part of the solution is re-heated by coil 21 with hot water from 16. Although preferably closed to atmospheric entry, tank 14 may be open or have an atmospheric vent. Its solution content is held until 10 is charged with the next coffee bean batch, when that heated solution portion is then drawn into 10 via valve controlled line 24 by the vacuum drawn on 10 by 12.

The purpose of that recirculation of a limited volume of previously prepared solution is as follows. More of the esters and acids, or oils, of flavor are recovered from the ground bean or tea leaves. Recirculation of part of the extract solution, while holding the lighter volatile components in captivity in the closed system and cooling in 34, results in the recovery of the more complex flavor and aroma constituents. Also by virtue of that recirculation a heavier Baumé of solution is taken off the batch in 10. That results in less water to be evaporated off the solution in the drying operations which follow.

The recovered extract solution may then be immediately fed either directly from cooler 34 or from tank 42, via a line 50 to dryer 52. Line 50 may include a circulation pump, or the extract solution drawn into 52, closed during operation, by the vacuum applied to it from vacuum pump 54 through condenser 56. In this case (but see below) the interior of dryer 52, and the contained solution is reduced to and kept frozen at a typical temperature of minus 30° to minus 40° F. during drying by sublimation of the water under a high vacuum maintained during the drying operation by vacuum pump 54. Drying a batch to substantially complete dryness requires eight to eleven hours. The sublimation vaporization of the water may be promoted by providing a series of shelves, indicated at 60, on which the frozen solution stands. When the final extract is completely dry and before the vacuum is released, a gas such as nitrogen is admitted from source 62 to displace all oxygen that might cause oxidation from the microscopic pores of the solid crystalline product. Dryer 52 is then opened, the dried crystalline product removed, and comminuted to any desired fineness for packing and use.

The immediately foregoing describes the procedure wherein the solution in liquid form may be fed from 34 or 42 into 52 where it is frozen. On the other hand, a preferred manner of transfer into 52 is as follows.

The solution from 34 or 42 is immediately introduced to a sharp freeze box such as indicated schematically in broken lines at 70, where it is frozen at a typical temperature of about minus 30° to minus 40° F. The frozen solid solution is then transferred into dryer 52 where drying then takes place by sublimation at substantially that temperature under the vacuum applied by 54 to 52. In either case, regardless of how the solution is moved from 34 or 42 into 52, it is immediately frozen on withdrawal from 34 or 42 at the temperature of about minus 30° to 40° F., and the drying by sublimation at the frozen temperature then takes place.

The surface area of the frozen solution in dryer 52 is made large to shorten the time of complete water sublimation.

In any case, whether the extract solution is fed directly from cooler 34 to the freezing dryer 52, or is fed through tank 42, or freezer 70, the solution is frozen without delay. It has been found by careful experiment that an aseptically canned solution such as comes from 34 will, on standing, go through internal changes with a precipitation of decomposed sediment and loss to the solution of certain flavor and aroma constituents. Immediate freezing of the solution from 34 eliminates that loss. The degree of the vacuum maintained in dryer 52 is such as to cause relatively rapid sublimation at the low frozen temperature.

To minimize presence of oxygen in 10, the water there used is preferably low in oxygen content. It may, for instance, be distilled water. And the sublimation water condensed in 56 may be fed back to heater 16.

The preferred typical temperature of the solution water from boiler 16 to container 10 has been given at about 208° F. In practice it may lie in the range between about 208° F. and 240° F. Likewise, preferred temperature to which the seed is heated in 14 may be about 180° F.; or in a range between 180° F. and 208° F. The typical temperature of 40° F. in cooler 34 may range between about 36° F. and 42° F.; and the typical freezing temperature of minus 30° F. in dryer 52 may range between about minus 20° F. and minus 36° F. or up to minus 40° F.

In use the final extract crystalline product is simply dissolved in either cold or hot water to produce the coffee or tea beverage. Only about one half a teaspoonful of the product is necessary to produce a coffee beverage of about the strength commonly liked; that, compared with the half to whole heaping tablespoonful per cup of ground bean used in ordinary known methods. The dried and comminuted product of either coffee or tea goes completely into soultion, leaving no residue or grounds in the cup. And the resultant beverage has all the flavors and aromas that are present in a beverage carefully prepared from fresh roasted coffee or tea leaves by the best presently known processes. Throughout the present process of preparing the final extract, at no time do any of the volatile esters or acids, or oils, have an opportunity to escape, deteriorate or be destroyed.

I claim:
1. In a process for producing from a material selected from the class consisting of coffee and tea an aqueous extract that retains volatile substances present in said material, the combination of the following steps:
   placing the material in a sealable container,
   evacuating the container to substantially remove atmospheric oxygen from the material,
   filling the container while still evacuated with hot aqueous fluid while preventing outflow from the container,
   then circulating aqueous fluid upward through the container at a temperature of about 208 to about 240° F. to form an aqueous solution with release of carbon dioxide and volatile substances as vapors from the material,
   passing the resulting solution and vapors in mutual contact downward through a cooling chamber at a temperature between about 36 and about 40° F. to absorb in the cooled solution substantially the whole of said vapors,
   said extraction and said cooling of the extract being carried out in a closed system with substantially complete exclusion of atmospheric oxygen and without loss of fluid from the system.

2. In a process for producing from a material selected from the class consisting of coffee and tea a concentrated extract that retains volatile substances present in said material, the combination of the following steps:
   placing the material in a sealable container,
   evacuating the container to substantially remove atmospheric oxygen from the material,
   filling the container while still evacuated with hot aqueous fluid while preventing outflow from the container,
   then circulating aqueous fluid upward through the container at a temperature of about 208 to about 240° F. to form an aqueous solution with release of carbon dioxide and volatile substances as vapors from the material,
   passing the resulting solution and vapors in mutual contact downward through a cooling chamber at a temperature between about 36 and about 40° F. to absorb in the cooled solution substantially the whole of said vapors, said extraction and said cooling of the extract being carried out in a closed system with substantially complete exclusion or atmospheric oxygen and without loss of fluid from the system, freezing the resulting cooled solution, and removing water from the frozen solution by sublimation at a temperature approximating minus 40 to minus 20° F. to produce a dry water-soluble concentrated extract.

References Cited by the Examiner

UNITED STATES PATENTS

| 2,338,608 | 1/1944 | Weisberg et al. | 99—71 |
| 2,431,496 | 11/1947 | Natelson et al. | 99—71 |
| 2,783,149 | 2/1957 | Epstein | 99—71 |
| 2,950,973 | 8/1960 | Cameron | 99—71 |

OTHER REFERENCES

Flosdorf: "Freeze-Drying," 1949, Reinhold Publ. Co., New York, pp. 21 to 26.

A. LOUIS MONACELL, *Primary Examiner.*